US007175323B2

(12) United States Patent
Bucher

(10) Patent No.: US 7,175,323 B2

(45) Date of Patent: Feb. 13, 2007

(54) PROJECTOR LAMP HEADLIGHT WITH CHROMATIC ABERRATION CORRECTION

(75) Inventor: Lloyd Keith Bucher, Livingston, TN (US)

(73) Assignee: Federal Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/102,012

(22) Filed: Apr. 8, 2005

(65) Prior Publication Data

US 2005/0225999 A1 Oct. 13, 2005

Related U.S. Application Data

(60) Provisional application No. 60/607,011, filed on Sep. 3, 2004, provisional application No. 60/560,797, filed on Apr. 8, 2004.

(51) Int. Cl.
*B60Q 1/00* (2006.01)
*F21V 11/06* (2006.01)

(52) U.S. Cl. ...................... 362/539; 362/509; 362/318; 362/293

(58) Field of Classification Search ........ 362/538–539, 362/507, 509, 318, 510, 293
See application file for complete search history.

(56) References Cited

U.S. PATENT DOCUMENTS

| | | | | |
|---|---|---|---|---|
| 3,042,827 | A | 7/1962 | Lopez | 313/112 |
| 3,598,989 | A | 8/1971 | Biggs | 240/46.01 |
| 4,142,229 | A * | 2/1979 | Hulbert, Jr. | 362/292 |
| 4,209,825 | A * | 6/1980 | Shackelford | 362/299 |
| 4,677,532 | A | 6/1987 | Peitz et al. | 362/61 |
| 4,814,960 | A * | 3/1989 | Liu | 362/307 |
| 4,949,226 | A | 8/1990 | Makita et al. | 362/61 |
| 5,023,758 | A * | 6/1991 | Allen et al. | 362/514 |
| 5,219,444 | A | 6/1993 | Chiaramonte et al. | 362/61 |
| 5,228,766 | A | 7/1993 | Makita et al. | 362/61 |
| 5,243,501 | A | 9/1993 | Makita et al. | 362/61 |
| 5,285,362 | A | 2/1994 | Sakata | 362/263 |
| 5,438,486 | A * | 8/1995 | McNair | 362/512 |
| 5,660,462 | A * | 8/1997 | Bockley et al. | 362/256 |
| 5,681,104 | A | 10/1997 | Chinniah et al. | 362/61 |
| 5,728,251 | A * | 3/1998 | Check, III | 156/307.5 |
| 5,829,870 | A * | 11/1998 | Remillard et al. | 362/510 |
| 5,967,651 | A | 10/1999 | Neumann et al. | 362/538 |
| 6,007,223 | A | 12/1999 | Futami | 362/517 |
| 6,017,138 | A * | 1/2000 | Reiss et al. | 362/297 |
| 6,126,301 | A | 10/2000 | Altunay et al. | 362/359 |

(Continued)

*Primary Examiner*—Ali Alavi
(74) *Attorney, Agent, or Firm*—Dickinson Wright PLLC

(57) ABSTRACT

A reduced glare projector style headlight assembly (10) comprises a light source (14), a reflector (12) and an optical lens (18). An opaque mask (16) is positioned between the lens (18) and the reflector (12) for creating an upper shadow region in the focused beam pattern (28) to shield on-coming traffic. The mask (16) includes a transition region (32) proximate its top edge (22) for allowing a limited amount of projected light to pass through the mask (16), into the upper shadow region in the focused beam pattern (28). In several embodiments, the mask (16) is applied or otherwise affixed to a transparent substrate (20) which also supports the transition region (32). To combat undesirable chromatic effects, a color filter (38) can be positioned in the light path (26) for disrupting selective wavelengths of light energy. As alternative approaches, the transparent substrate (20) and/or the lens (18') can be doped with a color filtering material or composition.

20 Claims, 4 Drawing Sheets

U.S. PATENT DOCUMENTS

| | | | | |
|---|---|---|---|---|
| 6,338,568 | B1 | 1/2002 | Futami | 362/538 |
| 6,491,416 | B1 | 12/2002 | Strazzanti | 362/464 |
| 6,550,943 | B2 | 4/2003 | Strazzanti | 362/464 |
| 6,558,026 | B2 | 5/2003 | Strazzanti | 362/464 |
| 6,582,111 | B2 | 6/2003 | Iwase | 362/520 |
| 6,601,981 | B2 | 8/2003 | Wilski | 362/510 |
| 2001/0021113 | A1 | 9/2001 | Eichler | 362/539 |
| 2002/0186568 | A1 | 12/2002 | Strazzanti | 362/464 |
| 2003/0007363 | A1 | 1/2003 | Yagi | 362/510 |
| 2003/0076688 | A1 | 4/2003 | Kobayashi | 362/510 |
| 2003/0174509 | A1 | 9/2003 | Futami | 362/517 |
| 2003/0202357 | A1 | 10/2003 | Strazzanti | 362/509 |
| 2003/0202358 | A1 | 10/2003 | Albou et al. | 362/510 |
| 2004/0145905 | A1 | 7/2004 | Strazzanti | 362/510 |

* cited by examiner

PROJECTOR LAMP HEADLIGHT WITH CHROMATIC ABERRATION CORRECTION

CROSS-REFERENCES TO RELATED APPLICATIONS

This patent application claims priority to U.S. Provisional patent application Ser. No. 60/560,797, filed Apr. 8, 2004 and U.S. Provisional patent application Ser. No. 60/607,011 filed Sep. 3, 2004.

FIELD OF THE INVENTION

This invention generally relates to headlight assemblies and, more specifically, to projector-type headlight assemblies used for forward illumination in vehicles.

BACKGROUND OF THE INVENTION

Vehicle headlights are primarily used to provide frontal illumination for improved visibility during nighttime driving. During use, most vehicle headlights have at least two states of operation. One is the high beam state used while driving on roadways without the presence of preceding or on-coming traffic. Another is the low beam state used during most nighttime driving conditions so as to enable the driver to see the roadway ahead while limiting dazzling glare that would otherwise result from use of the high beam state.

For low beam operation, governmental regulations typically require that the vehicle headlight provide a light distribution beam pattern having specific photometric requirements intended to protect on-coming traffic from harmful glare. Projector lamp headlights meeting these requirements typically exhibit a relatively stark light/dark cutoff line in the focused beam pattern. This sharp, so-called light-shadow line results from the use of an opaque metal mask to limit upward beam projection. The mask is positioned in the lower portion of the light path between the light source (and/or reflector) and the projector lens. Because of the inverting properties of the typical projector lens, the shadow cast by the mask is transferred to the upper regions of the projected beam pattern. Thus, the top edge of the mask creates, in the projected beam pattern from the headlight assembly, the light-shadow line in which the light is below the line and the shadow is above the line. This dark above/bright below distribution pattern provides lighting for road surface visibility, yet attempts to minimize glare to oncoming traffic.

When an automobile encounters a bump or dip in the roadway, the projected beam pattern can temporarily rise into the view of on-coming traffic. Because of the sharp line-shadow boundary, on-coming traffic will perceive the rising and falling beam pattern as a distracting flash of light.

Furthermore, projector-style headlights with metallic masks can create a so-called "chromatic aberration" or undesirable chromatic effect which tends to bring different colors of light into focus at different points. This aberration yields an effect of bright colored light bands that may annoy or confuse on-coming drivers. The colored light bands are believed to be created by the top edge of the metallic masks, although the underlying mechanism which creates this effect is disputed. According to one theory, the white light emanating from the light source strikes the top edge of the metallic mask, creating a prismatic lensing affect with the air around the top edge, thereby splitting the white light into the colored light bands (as depicted in FIG. 6A). According to another theory, light reflecting at an oblique angle off the top edge of the metallic mask is polarized and one orientation of the visible electromagnetic field vector is more prevalent (as depicted in FIG. 6B). Regardless of the cause, chromatic aberration is known to result in an undesirable effect in which the colored light bands often appear blue in color and are most noticeable when an on-coming vehicle having projector-style headlights hits a bump or dip in the road causing brief flashes of blue-violet light. These flashes impose distracting glare on opposing traffic, and may confuse an on-coming driver to think the approaching vehicle is a police car or other emergency vehicle.

There exists, therefore, a need to reduce the negative glare effects of the sharp light-shadow boundary as well as those caused by chromatic aberration, for the benefit of on-coming traffic.

SUMMARY OF THE INVENTION AND ADVANTAGES

According to a first aspect of the invention, a reduced glare projector style headlight assembly comprises a light source for projecting visible light, a reflector adjacent the light source for directing the light in a generally forward path, an optical lens positioned in the forward path for inverting and manipulating the light into a focused beam pattern, and an opaque mask positioned in a portion of the forward path between the lens and the reflector for creating an upper shadow region in the focused beam pattern to shield on-coming traffic. The mask has a top edge which establishes a light-shadow boundary in the focused beam pattern. The mask includes a transition region proximate its top edge for passing a limited amount of projected light through the mask. By allowing traces of projected light to be introduced above the light-shadow boundary in the focused beam pattern, on-coming traffic is benefited in that all or at least some of the effects of abrupt changes in light intensity as the light-shadow boundary are reduced as the light-shadow boundary crosses into and out of view of on-coming traffic.

According to another aspect of the invention, the reduced glare projector style headlight assembly comprises a light source for projecting visible light, a reflector adjacent the light source for directing the light in a generally forward path, an optical lens positioned in the forward path for inverting and manipulating the light into a focused beam pattern, a color filter positioned in the forward path for disrupting selective wavelengths of light energy, and an opaque mask positioned in a portion of the forward path between the lens and the reflector for creating an upper shadow region in the focused beam pattern to shield on-coming traffic. The mask has a top edge establishing a light-shadow boundary in the focused beam pattern, and includes a transition region adjacent its top edge. The transition region allows a limited amount of light in the forward path to pass through the mask so that traces of projected light are introduced above the light-shadow boundary in the focused beam pattern. This, in turn, minimizes the distraction to on-coming traffic which may otherwise result from abrupt changes in light intensity as the light-shadow boundary crosses into and out of view. Any chromatic aberration created in the assembly is controlled through the color filter.

According to yet another aspect of the invention, the reduced glare projector style headlight assembly comprises a light source for projecting visible light, a reflector adjacent the light source for directing the light in a generally forward path, an optical lens positioned in the forward path for inverting and manipulating the light into a focused beam pattern, the lens containing a color filtering material for disrupting selective wavelengths of light energy in the light path, and an opaque mask positioned in a portion of the forward path between the lens and the reflector for creating an upper shadow region in the focused beam pattern to shield on-coming traffic. The mask has a top edge establishing a light-shadow boundary in the focused beam pattern, and includes a transition region adjacent its top edge. The transition region allows a limited amount of light in the forward path to pass through the mask so that traces of projected light are introduced above the light-shadow boundary in the focused beam pattern. In this configuration, on-coming traffic is not confronted with abrupt changes in light intensity as the light-shadow boundary crosses into and out of view, and any chromatic aberration created in the assembly is controlled through the color filtering lens.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF PREFERRED EMBODIMENTS

Figure 1:
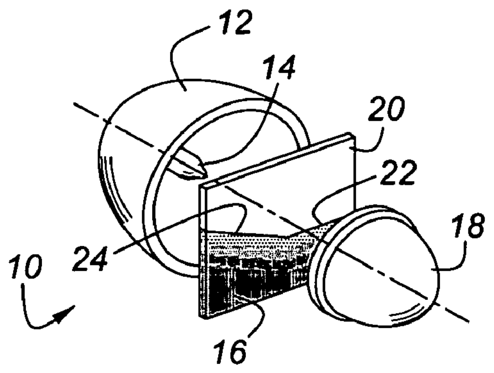
FIG. 1 shows a simplified perspective view of an embodiment of a headlight assembly of the present invention including a lamp, reflector, mask, and lens.

Referring to FIG. 1, there is generally shown a projection-style headlight assembly 10 that includes a reflector 12 for directing light in a generally forward path, a light source 14 positioned within the focal point of the reflector 12, an opaque mask 16 positioned forward of the light source 14, and a lens 18 positioned forward of the mask 16. The light source 14 can be of any known variety, including halogen, tungsten, high-intensity-discharge, or the like. The reflector 12, mask 16, and lens 18 are all preferably interconnected by a lens holder (not shown) and the entire headlight assembly 10 may be encased within a larger headlight housing (not shown), as is well known in the art. In contrast to the mask 16, the reflector 12, light source 14, and lens 18 as represented in FIG. 1 are components which are all substantially known and available to those of ordinary skill in the art.

Figure 2:
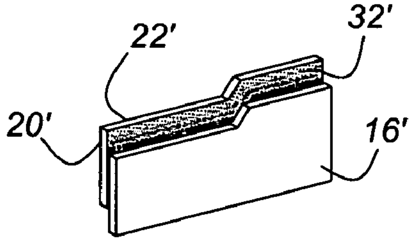
FIG. 2 is a perspective view of an alternative embodiment of the opaque mask with offset transition region.
Figure 3:
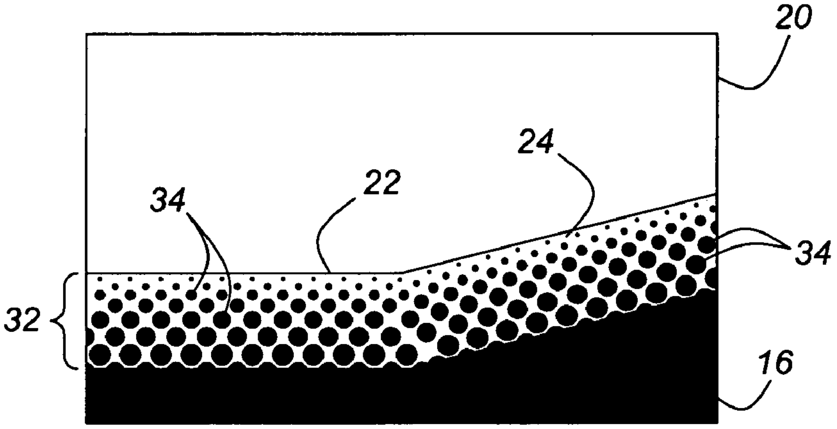
FIG. 3 a front view, looking forward through the mask of the headlight assembly of FIG. 1, showing the transition region in an exaggerated fashion for illustrative purposes.
Figure 4:
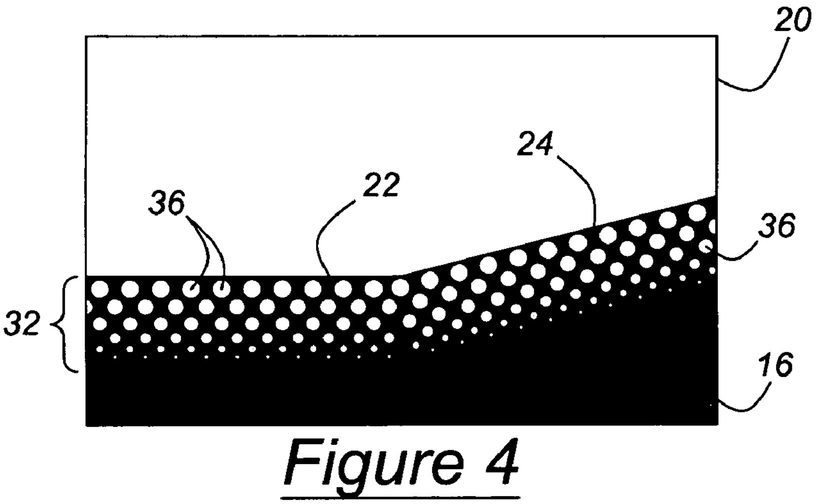
FIG. 4 is a view as in FIG. 3 but showing an alternative configuration of the transition region.

The mask 16 is shown to be of substantially rectangular shape but could take other shapes with equal effect, including shapes to fit within the enclosure of the non-depicted lens holder or headlight housing. The enlarged rectangular shape of the mask 16 in FIG. 1 is intended to remove all of its side and bottom edges out of the forward path of light so that any negative air/edge effects can be reduced. The mask 16 may be integrated with a co-planer transparent substrate 20 composed of glass or plastic, such as shown in FIGS. 1, 3 and 4. In this condition, the mask 16 is composed of an opaque film or coating applied to the transparent substrate 20 using any well-known technique, such as glazing, etching, embedding, coating, or the like. Alternatively, the mask 16' may be affixed in piggy-backed fashion, i.e., fixed in an offset plane, to the transparent substrate 20' as illustrated in FIG. 2, for the reasons discussed below.

Figure 5:
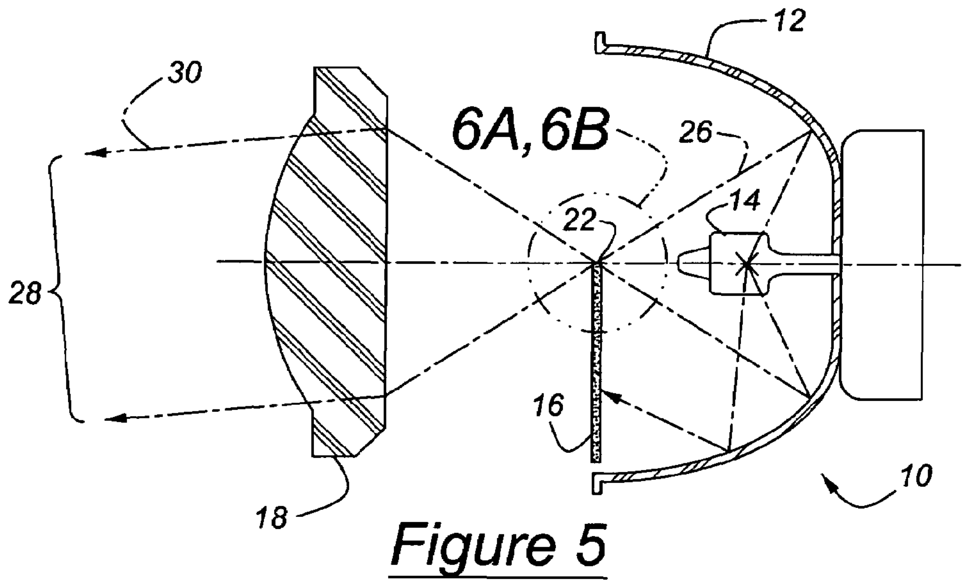
FIG. 5 is a simplified cross-sectional view of another embodiment of the subject headlight assembly showing the forward path of light as redirected by the reflector and the focused beam pattern emanating from the lens.

The mask 16 covers a region which terminates at its uppermost reaches in a top edge 22. The mask 16 is shown in several views with the top edge 22 including an angled portion 24 for selective blocking of light, but this angled portion 24 is optional and if used can take various shapes and configurations depending upon the desired beam pattern. Regardless of the specific configuration, the top edge 22 establishes the light-shadow boundary in the focused beam pattern. In FIG. 5, light rays are represented in broken lines, with a forward path 26 of light from the reflector 12, a focused beam pattern 28 emanating from the lens 18, and the light-shadow line 30 comprising the upper reaches of the focused beam pattern 28.

Referring now to FIG. 3, there is shown a forward-facing elevation view of the mask 16. The mask 16 includes a transition region 32 proximate its top edge 22 for passing a limited amount of projected light through the mask 16. The transition region 32 allows traces of projected light to be introduced above the light-shadow boundary 30 in the focused beam pattern 28. This benefits on-coming traffic by reducing all or at least some of the effects of abrupt changes in light intensity as the light-shadow boundary 30 crosses into and out of view of on-coming traffic. The transition region 32 preferably includes varying levels of light transparency from completely opaque at its bottom to partially opaque at its top. Partially opaque is intended to mean partially impenetrable to visible light while a fractional portion of the available visible light passes through the lens 18. In any case, the transition region can occupy only some or nearly all of the mask 16, thus making it gradually or progressively transmissive of light either over the entirety of the mask 16 or across just the upper portion of the mask 16 as depicted in FIGS. 2–4.

As one example, the transition region 32 can be formed in bands or a progression of opaqueness in which substantially all visible light is blocked (i.e. >~90% visible light blocked) at a lower, maximum opaqueness section, an intermediate opaqueness section blocks some of the visible light (e.g. 50% blocked), and a minimally opaque section blocks only a very little visible light (e.g. 10% blocked). The minimally opaque section is proximate the top edge 22. This transition can be accomplished in any number of ways. As one example, illustrated in an exaggerated fashion in FIG. 3, the transition region 32 includes a plurality of discrete opaque spots 34 around which the transparent substrate 20 is revealed. The opaque spots 34 could be formed on the transparent substrate 20 using the same materials and techniques used to form the mask 16 on the transparent substrate 20. The plurality of discrete opaque spots 34 may have a generally repetitive geometric shape, such as the circles shown in FIG. 3. They may be other shapes or patterns or grid designs as well. The area bounded by the discrete opaque spots 34 of FIG. 3 near the top edge 22 is less than the area bounded by the discrete opaque spots 34 spaced farther away from the top edge 22. In other words, the discrete opaque spots 34 are large in diameter near the bottom of the transition region 32 and get progressively smaller as they approach the top edge 22.

Alternatively, as in FIG. 4, the transition region 32 may include a plurality of discrete voids 36 through which the transparent substrate 32 is revealed. These discrete voids 36 can also have a generally repetitive geometric shape, like the circles shown in FIG. 4. However, as before, other geometric shapes and/or designs can be used. To accomplish the progression from opaqueness to transparency, the area bounded by the discrete voids 36 proximate the top edge 22 is greater than the area bounded by the discrete voids 36 spaced farther away from the top edge 22.

FIGS. 3 and 4 each represent alternative applications of the well-known frit band technique used in some prior art windshield glass. Generally, a frit band is composed of black enamel applied around the periphery of the windshield and baked into the glass. This frit band typically appears as a border of gradated dots or apertures that partially serves as a built-in sun visor. However, many other techniques could be used to produce the novel transition region 32 of the mask 16 as presented in this invention. For example, the mask 16 could be formed as an all metallic plate, with holes punched about its upper areas to form the transition region 32, as intended in FIGS. 5–9. Instead of holes, a saw-tooth pattern or comb-like fringes could be formed in the upper areas of the mask 16. Any of these techniques, as well as other designs could be employed to achieve the objective of allowing a limited amount of light in the forward path 26 to pass through the mask 16 so that traces of projected light are introduced above the light-shadow boundary 30 in the focused beam pattern 28. This is desired to minimize the distraction to on-coming traffic which may otherwise result from abrupt changes in light intensity as the light-shadow boundary 30 crosses into and out of view.

Figure 6A:
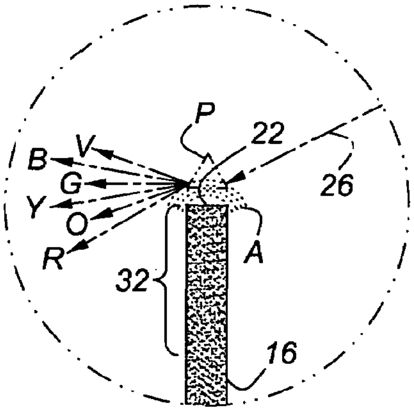
FIGS. 6A and 6B are enlarged views of the region identified in FIG. 5, illustrating alternative theories to explain the cause of chromatic aberration.
Figure 6B:
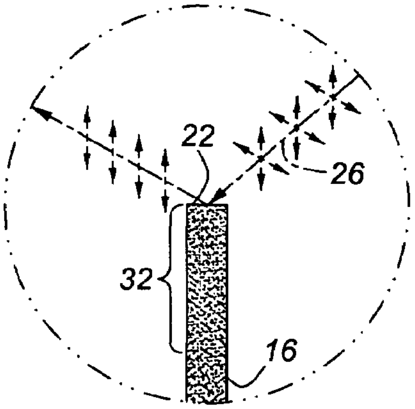

The air/edge interface on the mask 16 is illustrated in 6A, where air is represented by the lines A and a hypothetical prism is shown in phantom at P. Light from the light source 14 passing through the prism P (i.e., the air/edge interface A) is dispersed into a color spectrum (ROYGBV), with the light in the blue-violet ranges tending to cause the greatest irritation to on-coming traffic. In the alternative, if the problematic chromatic effect may be caused by light reflecting at an oblique angle off the top edge 22 of the metallic mask 16 into a polarized condition, as illustrated in FIG. 6B.

The mask 16 need not be embedded within or upon a transparent substrate 20 as described in connection with the FIGS. 1 and 3–4. Instead, the mask 16' may be a separate component of material that is adhered, assembled, or otherwise affixed to the transparent substrate 20'. In FIG. 2, this alternative embodiment is illustrated by way of the mask 16' comprising a metallic plate of conventional design. The transition region 32 is applied to an independent transparent substrate 20'. This embodiment addresses the color banding that might otherwise occur due to the air/edge effects of the metal mask 16, by disrupting air flow over the top edge 22.

In all of the embodiments of the invention thus far addressed, the problematic chromatic effect is eliminated by moving and/or disrupting the air A at the air/edge interface out of the path of light emanating from the light source. As an alternative approach, or as an additive approach, air/edge effects can be further reduced or eliminated using absorptive or interference surface treatment of the transparent substrate 20. For example, absorptive and interference coatings are known which can be used to selectively block certain wavelengths of light. Absorption occurs in an absorptive coating in the visible region of the light spectrum where electromagnetic energy does not pass through the coating. In other words, predetermined wavelengths of energy are absorbed and not necessarily reflected by the coating. An optical filter integrated into the transparent substrate 20 may include an interference coating in which the wavelengths that are not transmitted through the filter are removed by interference phenomena rather than by absorption or scattering. Such interference coatings or filters typically include alternating layers of two or more materials of different refractive indices to selectively transmit and/or reflect light from various portions of the electromagnetic spectrum such as ultraviolet, visible, and IR radiation. A common technique to create an optical filter is to use dichroic coating processes, which are well known to those of ordinary skill in the art.

Moreover, the mask 16 may be produced by providing all or a portion of the transparent substrate 20 as a dichroic or semi-absorptive material, by providing such material as a coating on the transparent substrate 20, or by providing all or a portion of the substrate 20 as gradient-index glass or the like.

Figure 7:
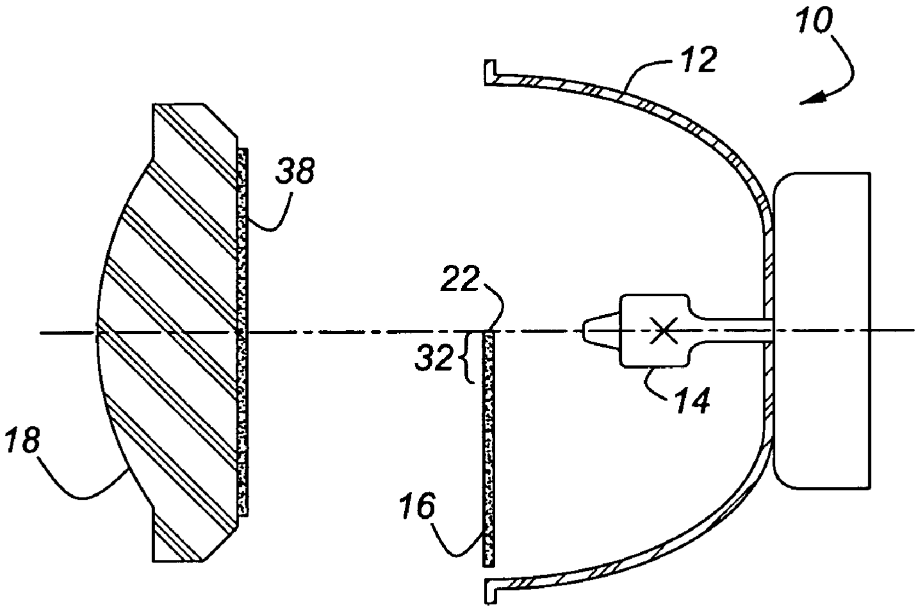
FIG. 7 is an alternative embodiment of the invention in which a color filtering coating is applied to the lens.
Figure 8:
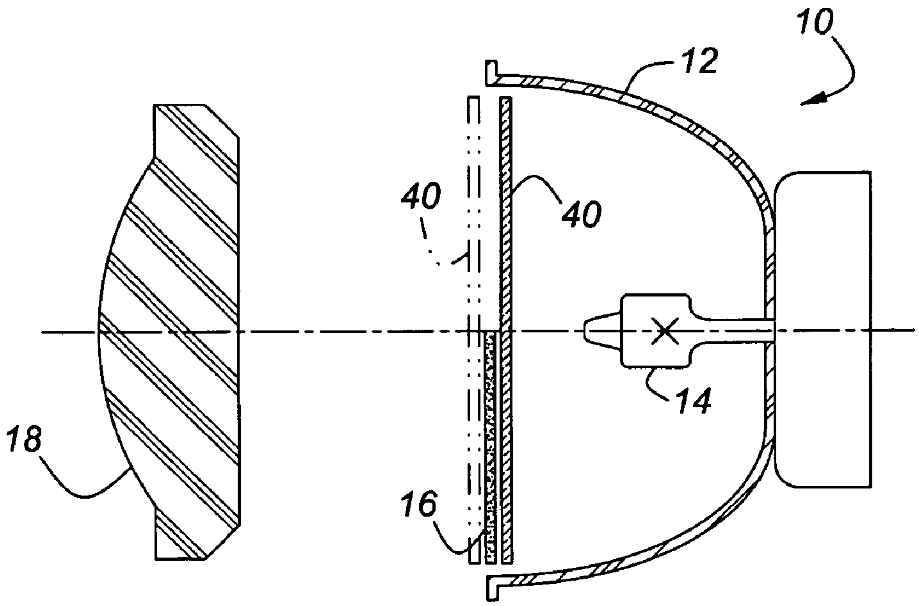
FIG. 8 is an alternative embodiment of the invention in which a color filter is positioned between the light source and the lens.
Figure 9:
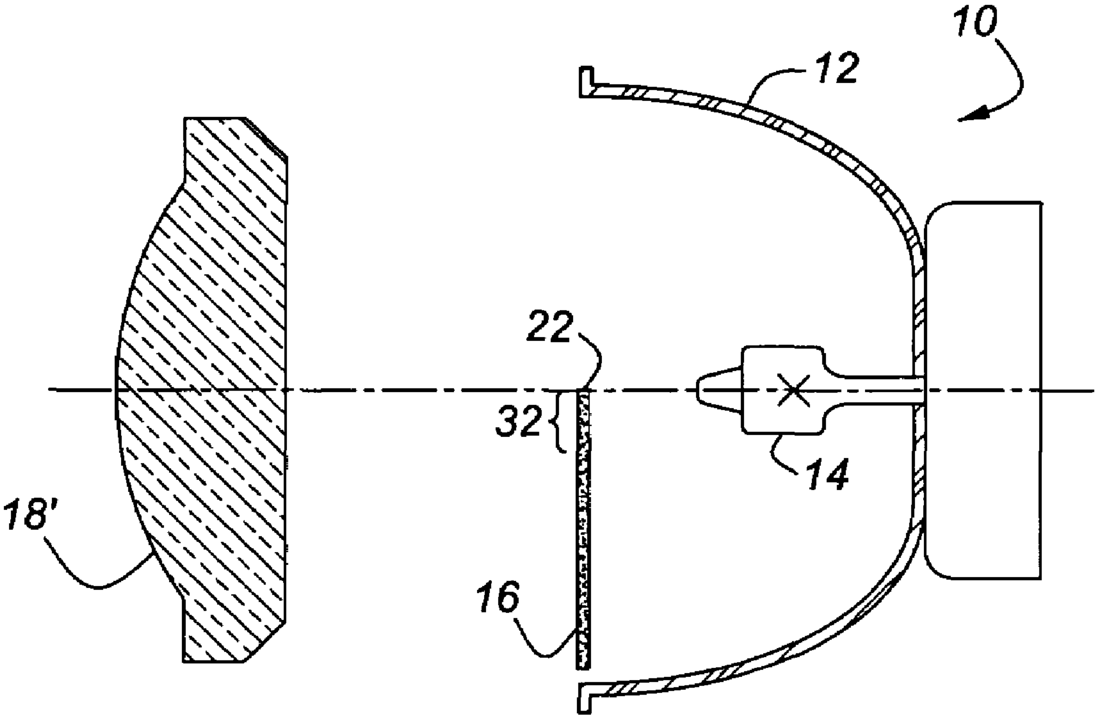
FIG. 9 is an alternative embodiment of the invention in which the lens is impregnated with color filtering material.

Turning now to FIGS. 7–9, various alternative embodiments are proposed in which the problematic chromatic effect (illustrated in FIGS. 6A and 6B) will be overcome when a transparent substrate 20 is not used or not available. Without the transparent substrate 20, the chromatic aberration phenomenon may be more pronounced by the transition region 32, since additional surfaces are created against which the forward path light might react. In these examples, the objectionable blue-violet (or other color range or vector orientation) light is absorbed or scattered with the use of color filtering techniques.

In FIG. 7, the chromatic effect is addressed by applying a color filtering coating 38 to the lens 18. Such coatings are well known in the art, and may be of the dichroic type which transmits only certain wavelengths of light while reflecting the rest of the spectrum, or of any other known coating type for the purpose of filtering objectionable light wavelengths and/or vector orientations. In this manner, the irritating blue-violet light does not pass through the lens 18. Of course, any objectionable light wavelength (including the blue-violet ranges or other ranges or vector orientations) can be selectively filtered by adjusting the composition of the coating 38.

In the embodiment of FIG. 8, a color filter 40 is positioned within the forward light path 26, and preferably between the light source 14 and the lens 18. As shown, the color filter 40 can be fixed in the headlamp housing adjacent the mask 16 in either of the solid or phantom positions illustrated. The color filter 40 may be made of commercially available materials of the type used extensively in the photography and lighting fields, for example dichroic filters, gel-type filters, and the like. The color filter 40 selectively blocks the objectionable wavelengths of light, thus preventing blue-violet (or objectionable polarized) light from passing through the lens 18. As an extension of this concept, multiple color filters 40 of various filtering characteristics can be ganged to filter selected ranges and/or orientations of wavelengths.

In FIG. 9, the lens 18' is doped with a color filtering material. The specific material can be selected from any one of the commercially available compositions, such as may be know in the art. The glass (or other constituent material) of the lens 18' is mixed in its raw, uncongealed state with the color filtering material. The resulting composition is later formed into the lens shape, thus possessing inherent color filtering properties.

The present invention provides a projector headlight assembly 10 that provides a softer light-shadow cutoff 30 to reduce or eliminate glare due to bouncing beam patterns projected onto on-coming traffic as well as due to negative chromatic effects.

It will be understood that the forgoing description is of preferred exemplary embodiments of the invention and that the invention is not limited to the specific embodiments shown. Various changes and modification will be apparent to those skilled in the art. For example, multitudes of different masking techniques and mask 16 geometries could be used. Also, although a rectangular mask is shown, any other shape suitable for a particular application can be used. All such changes and modifications are intended to be within the scope of this invention.

I claim:

1. A reduced glare projector style headlight assembly, comprising:

a light source for projecting visible light;

a reflector adjacent said light source for directing the light in a generally forward path;

an optical lens positioned in said forward path for inverting and manipulating the light into a focused beam pattern;

an opaque mask positioned in a portion of said forward path between said lens and said reflector for creating an upper shadow region in said focused beam pattern to shield on-coming traffic, said mask having a top edge establishing a light-shadow boundary in said focused beam pattern; and said mask including a transition region proximate said top edge for passing a limited amount of projected light below said top edge whereby traces of projected light are introduced above said light-shadow boundary in said focused beam pattern so that on-coming traffic is not confronted with abrupt changes in light intensity as said light-shadow boundary crosses into and out of view.

2. The assembly of claim 1 wherein said transition region includes a transparent substrate revealed in progressively varying amounts through said mask in directions normal to said top edge.

3. The assembly of claim 2 wherein said transition region is fixed in a plane co-planar with said mask.

4. The assembly of claim 2 wherein said transition region is fixed in a plane offset from the remainder of said mask.

5. The assembly of claim 2 wherein said transition region includes a plurality of discrete opaque spots around which said transparent substrate is revealed.

6. The assembly of claim 5 wherein said plurality of discrete opaque spots have a generally repetitive geometric shape, and wherein the area bounded by said discrete opaque spots proximate said top edge is less than the area bounded by said discrete opaque spots spaced farther away from said top edge.

7. The assembly of claim 2 wherein said transition region includes a plurality of discrete voids in said mask through which said transparent substrate is revealed.

8. The assembly of claim 7 wherein said plurality of discrete voids have a generally repetitive geometric shape, and wherein the area bounded by said discrete voids proximate said top edge is greater than the area bounded by said discrete voids spaced farther away from said top edge.

9. The assembly of claim 2 wherein said transparent substrate extends above said top edge of said mask into said forward path of light.

10. The assembly of claim 2 wherein said transition region includes a plurality of discrete voids in said mask through which said transparent substrate is revealed.

11. The assembly of claim 1 wherein said mask is composed of at least one of a dichroic and an absorptive material.

12. The assembly of claim 1 wherein said transparent substrate is composed of gradient-index glass to establish at least a portion of said mask.

13. The assembly of claim 2 wherein said mask includes a metallic shield with said transparent substrate being positioned adjacent said metallic shield.

14. The assembly of claim 1 further including a color filter positioned in said forward path for disrupting selective wavelengths of light energy.

15. The assembly of claim 14 wherein said color filter is disposed between said mask and said lens.

16. The assembly of claim 15 wherein said color filter is affixed to said lens.

17. The assembly of claim 14 wherein said color filter is disposed between said light source and said mask.

18. The assembly of claim 1 wherein said lens contains a color filtering material for disrupting selective wavelengths of light energy in said light path.

19. A reduced glare projector style headlight assembly, comprising:

a light source for projecting visible light;

a reflector adjacent said light source for directing the light in a generally forward path;

an optical lens positioned in said forward path for inverting and manipulating the light into a focused beam pattern;

a color filter positioned in said forward path for disrupting selective wavelengths of light energy;

an opaque mask positioned in a portion of said forward path between said lens and said reflector for creating an upper shadow region in said focused beam pattern to shield on-coming traffic, said mask having a top edge establishing a light-shadow boundary in said focused beam pattern;

said mask including a transition region adjacent said top edge thereof, said transition region allowing a limited amount of light in said forward path to pass through said mask whereby traces of projected light are introduced above said light-shadow boundary in said focused beam pattern so that on-coming traffic is not confronted with abrupt changes in light intensity as said light-shadow boundary crosses into and out of view.

20. A reduced glare projector style headlight assembly, comprising:

a light source for projecting visible light;

a reflector adjacent said light source for directing the light in a generally forward path;

an optical lens positioned in said forward path for inverting and manipulating the light into a focused beam pattern, said lens containing a color filtering material for disrupting selective wavelengths of light energy in said light path;

an opaque mask positioned in a portion of said forward path between said lens and said reflector for creating an upper shadow region in said focused beam pattern to shield on-coming traffic, said mask having a top edge establishing a light-shadow boundary in said focused beam pattern;

said mask including a transition region adjacent said top edge thereof, said transition region allowing a limited amount of light in said forward path to pass through said mask whereby traces of projected light are introduced above said light-shadow boundary in said focused beam pattern so that on-coming traffic is not confronted with abrupt changes in light intensity as said light-shadow boundary crosses into and out of view.

* * * * *